United States Patent [19]
Hoppe

[11] Patent Number: 4,581,695
[45] Date of Patent: Apr. 8, 1986

[54] RECTIFIER ASSEMBLY

[75] Inventor: Richard J. Hoppe, Rockford, Ill.

[73] Assignee: Sundstrand Corporation, Rockford, Ill.

[21] Appl. No.: 682,271

[22] Filed: Dec. 12, 1984

[51] Int. Cl.[4] .......... H02M 1/00; H02K 11/00
[52] U.S. Cl. .......... 363/145; 310/68 D
[58] Field of Search .......... 363/67, 126, 144, 145; 310/68 D

[56] References Cited

U.S. PATENT DOCUMENTS

| | | | |
|---|---|---|---|
| 3,366,171 | 1/1968 | Scharli | 165/80 R |
| 3,412,271 | 11/1968 | Hall | 310/68 D |
| 3,509,447 | 4/1970 | Wharton | 322/87 |
| 3,590,291 | 6/1971 | Spisak et al. | 310/68 D |
| 3,604,960 | 9/1971 | Krestel | 310/68 D |
| 3,686,523 | 8/1972 | Gorden et al. | 310/72 |
| 3,723,794 | 3/1973 | Spisak et al. | 310/68 D |
| 3,829,725 | 8/1974 | Petersen et al. | 310/68 D |
| 3,838,303 | 9/1974 | Ernst | 310/68 D |
| 3,872,335 | 3/1975 | Petersen et al. | 310/68 D |
| 3,902,774 | 9/1975 | Gronholm | 339/5 M |
| 4,144,932 | 3/1979 | Voigt | 310/68 D |
| 4,429,263 | 1/1984 | Muller | 318/254 |

FOREIGN PATENT DOCUMENTS 2805567 5/1978 Fed. Rep. of Germany .

*Primary Examiner*—Peter S. Wong
*Attorney, Agent, or Firm*—Wood, Dalton, Phillips, Mason & Rowe

[57] ABSTRACT

Resistance to centrifugally acting forces in an axially and radially compact rectifier assembly particularly suited for mounting in a rotary component of a dynamoelectric machine is achieved in a full wave, three phase rectifier assembly. The assembly includes first and second blocks 18, 20, each having three radially outwardly facing diode receiving surfaces 22, 24, 26. Six diode wafers 28 are located on the surfaces and are sandwiched thereagainst by six electrically conductive load shoes 40. Three phase conductors 54 are interposed between the load shoes 40 and a shrink fitted cylindrical housing 10 and electrically connect aligned load shoes 40 associated with each of the blocks 18 and 20.

15 Claims, 3 Drawing Figures

RECTIFIER ASSEMBLY

FIELD OF THE INVENTION

This invention relates to a rectifier assembly, and more specifically, to a full wave, three phase rectifier assembly which may be used, for example, in a rotating dynamoelectric machine such as a brushless generator.

BACKGROUND OF THE INVENTION

Full wave, three phase rectifiers are employed in a variety of environments. Depending upon the specific environment in which they are used, various requirements attend the construction of the rectifier.

One application requiring somewhat unusual constraints upon the rectifier design is in so-called "brushless generators". In a typical brushless generator construction, three phase windings forming part of an exciter are carried by the rotor. Rotor rotation results in the generation, in such windings, of a three phase signal. Such signal is then rectified by a rectifier carried by the rotor to provide a source of direct current to the main field winding of the generator which is also carried by the rotor.

Because the rectifier forms part of the rotor, it must be capable of withstanding the high centrifugal forces placed upon its components during generator operation. It is also highly desirable that the same be as compact as possible, both axially and radially, so that the overall size of the rotor can be made as small as possible.

Another desirable feature is ease of serviceability. The rectifier assembly must be made such the it can be easily replaced and/or serviced.

The present invention is directed to the provision of a three phase, full wave rectifier assembly meeting the above stated requisites.

SUMMARY OF THE INVENTION

It is the principal object of the invention to provide a new and improved full wave, three phase rectifier assembly that maybe used as part of a rotor in a dynamoelectric machine, is axially and radially compact, is readily serviceable and which can stand up to high forces applied to it.

An exemplary embodiment of the invention achieves the foregoing object in an assembly including first and second blocks of conducting material in side by side but electrically isolated relation. Each of the blocks has three radially outwardly facing diode receiving surfaces. Six diode wafers, one for each surface are provided. Each has an anode and a cathode and the cathodes of three of the diodes are in electrical contact with respective ones of the surfaces of the first block. The anodes of the remaining three diodes are in electrical contact with respective ones of the surfaces of the second block. Six electrically conductive load shoes, one for each diode, are provided. They are placed in electrical contact with a respective diode oppositely of the associated surface of the blocks. Three phase conductors, one for each phase are likewise provided and each phase conductor electrically interconnects a load shoe associated with each block. Two field conductors are provided and each is connected to a respective block. A circumferential housing surrounds the load shoes and clamps them against the diode which they abut to thereby clamp the diode against the associated surface on the associated block.

As a result of this construction, an axially and radially compact full wave, three phase rectifier module capable of withstanding high rotational forces is provided.

The invention further contemplates the housing be a cylindrical and that the load shoes, oppositely of the diodes, have cylindrical surfaces. An insulating layer may be disposed between the tube and the load shoes and the phase conductors are sandwiched between the insulating layer and the load shoes to be clamped against the load shoes by the housing.

When used in a brushless generator requiring a field resistor for dissipating power spikes normally associated with the operation of such rectifiers, a resistor may be disposed within the housing and extends between and is electrically connected to the blocks.

In a highly preferred embodiment, the blocks have aligned bores. One of the field conductors extends through the bore in one block in spaced relation thereto and is threaded into electrical connection with the bore in the second block. Additional aligned bores may be provided in the blocks with the other of the field connectors being threaded into the additional bore in the first block.

The resistor may be disposed in the additional bore in the other block and electrically connected to the other block in such bore and to the first block, either at the additional bore or to the other field connector as desired.

Preferably, the housing is shrink fitted on the load shoes.

In a highly preferred embodiment, each of the blocks have the cross sectional shape of an equilateral triangle. Provision can be made for passing a coolant through the assembly.

Other objects and advantages will become apparent from the following specification taken in connection with the accompanying drawings.

DESCRIPTION OF THE PREFERRED EMBODIMENT

Figures 1, 2, 3:
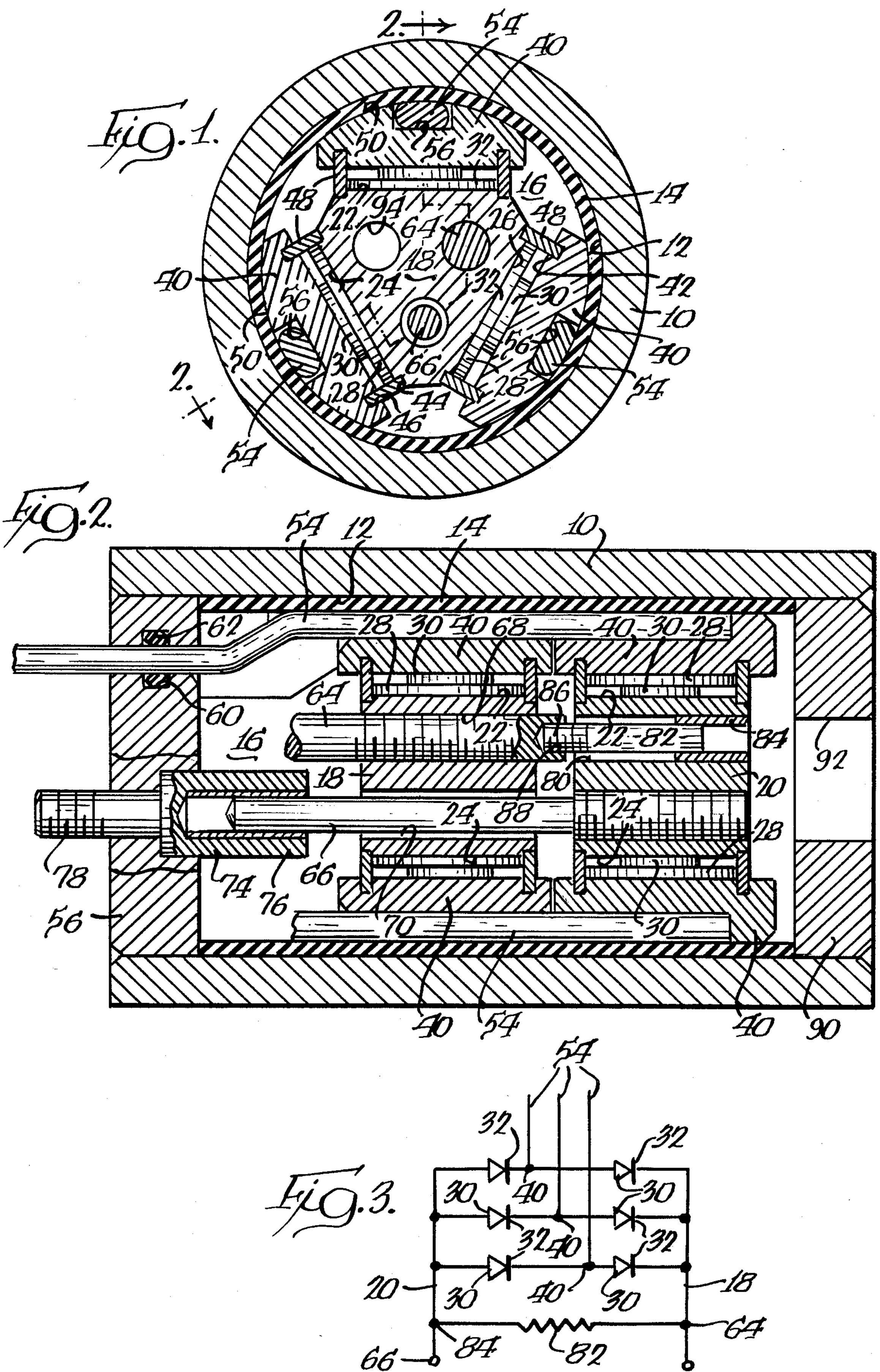
FIG. 1 is a sectional view of a rectifier assembly made according to the invention.
FIG. 2 is a sectional view taken approximately along the line 2—2 in FIG. 1.
FIG. 3 is an electrical schematic of the rectifier.

An exemplary embodiment of a rectifier assembly made according to the invention is illustrated in the drawings and with reference to FIGS. 1 and 2 is seen to include a cylindrical, tubular housing 10 which, of course, has a cylindrical interior 12. The housing 10 may be formed of any suitable material but inasmuch as, in the preferred embodiment, the housing 10 is shrink fitted upon the other components of the assembly, it will most typically be made of metal. Consequently, the interior surface 12 of the housing 10 is provided with a cylindrical sleeve 14 of insulating material to electrically isolate the housing 10 from the rectifier components.

Centrally within the cavity 16 defined by the interior of the tubular housing 10, in axially side by side relation, are first and second blocks 18 and 20. The blocks 18 and 20 are formed of electrically conductive material and typically will be formed of metal that is highly thermally conductive as well. As best seen in FIG. 1, the block 18 has a cross-sectional shape in the form of an equilateral triangle. The block 20 has the same triangular shape.

As a consequence of this construction, each of the blocks 18 and 20 will have three, radially outwardly facing surfaces 22, 24, and 26. The surfaces 28, 24 and 26 are diode receiving surfaces for making electrical contact with a respective diode wafer 28. As is known, a diode wafer is a semiconductor wafer without the usual "package" supplied by the manufacturer. In the usual case, each wafer will appear as a thin cylinder of relatively small diameter superimposed centrally on a thin cylinder of larger diameter. Typically, the smaller cylinder 30 will be the anode while the larger cylinder 32 will be the cathode.

As seen in FIGS. 1 and 2, three diodes 28 are electrically engaged via their cathodes 32 to respective ones of the surfaces 22, 24 and 26 of the block 18. Three additional diodes 28 are likewise electrically abutted against respective ones of the surfaces 22, 24 and 28 on the block 20 and as seen in FIG. 2, the additional diodes 28 are inverted from the positions they assume in association with the block 18, namely, such diodes 28 associated with the block 20 electrically engage the block 20 with their anodes 30.

The assembly includes six load shoes 40, one for each of the three surfaces 22, 24 and 26 of each of the blocks 18 and 20. The load shoes 40 are disposed radially outwardly of the diodes 28 and abut respective diodes 28 to establish electrical connection therewith oppositely of the diodes' electrical connection to the associated block 18 or 20. The load shoes 40 have a radially inner flat surface 42 for the purpose. Aligned annular grooves 44 and 46 in the blocks 18 and 20 on the one hand and the load shoes 40 on the other hand receive hollow cylindrical seals 48 formed of any suitable elastomer. Thus, the diodes 28 are sealed between their associated load shoe 40 and associated block 18 or 20 by the seals 48.

The radially outer surface 50 of each load shoe 40 is cylindrical and has the same radius of curvature as the inner diameter of the insulating sleeve 14. Consequently, when the housing 10 is shrink fitted upon the assembly, it will exert, through the insulating sleeve 14, a compressive force, uniformly across the load shoes 40 to thereby provide uniform loading of each of the diodes 28 to establish excellent electrical contact between the load shoes 40 and the diodes 28 on the one hand and the diodes 28 and the blocks 18 and 20 on the other.

The assembly also includes three phase conductors, one for each incoming phase of the alternating current signal to be rectified. The phase conductors are designated 54. Each is received in radially outwardly opening grooves 56 in the load shoes 40. As seen in FIG. 2, each phase conductor 54 extends between two load shoes 40, one associated with the block 18 and the other associated with the block 20.

In a preferred embodiment, the phase conductors 54 are shaped so that they are likewise somewhat compressed against their associated load shoes 40 upon the shrink fitting of the housing 10 upon the assemblage to assure good electrical contact.

The phase conductors 54 extend generally axially within the housing 10. One end of the housing 10 is closed by a cap 56 formed of insulating material and provided with suitable openings 58 through which the phase conductors 54 may emerge. The cap 56, around each opening 58, will include an annular, radially inwardly opening groove for receiving an 0-ring seal 62 which seals the interface of the cap 56 and each phase conductor 54.

The assemblage also includes a pair of field conductors 64 and 66, so termed becaused, in a brushless generator, they would be connected to the field winding of the main generator. As can be seen in FIG. 2, the field conductor 64 is threaded into electrical connection with the block 18 at a bore 68 therein.

The field conductor 66 extends through a bore 70 in the block 18 without touching the same to be threaded within an aligned bore 72 in the block 20. Terminal connectors such as the one shown at 74 may be potted in the cap 56 to extend through the same. One end 76 electrically connects to the field conductors 64 and 66 while the other end may be threaded as at 78 for receipt of a fastener whereby the same may be connected into the electrical system with which the rectifier is used.

The block 20 may be provided with an additional bore 80 aligned with the bore 68 in the block 18. A resistor 82 is disposed in the bore 80 and electrically connected to the block 20, at one end, by a conductive sleeve 84 contacting both the resistor 82 and the block 20. At its opposite end, the resistor 82 is threaded as at 86 into the end of the field conductor 64. Thus, the resistor 22 extends across the gap electrically isolating the blocks 18 and 20 within the housing 10 to interconnect the two.

The end of the housing 10 opposite the cap 56 is closed by a cap 90 having an opening 92 therein. A similar opening (not shown) may be provided in the cap 56.

The opening 92 is a coolant inlet whereby a liquid coolant, such as oil, may be flowed to the interior of the housing 10 to contact the various components (other than the diodes 28 which are encapsulated by the seals 48) to carry off heat generated during the operation of the rectifier. If desired, bores 94 (FIG. 1) in addition to those employed with the field conductors 64 and 66, may be provided in the blocks 18 and 20 to enhance the cooling effect.

FIG. 3 schematically illustrates the full wave, three phase rectifier thus established. The electrical configuration is, of course, conventional for such a rectifier but FIG. 3 utilizes the same reference numerals given in connection with the description of the physical components shown in FIGS. 1 and 2 for corresponding locations in the circuit.

Thus, it will be appreciated that an assembly made according to the invention is quite compact, both axially and radially such that it may be easily disposed, in a minimum volume, in a rotor for a brushless generator or the like. The configuration of the components with respect to each other and with respect to the shrink fitted housing 10 assures that electrical contact can be reliably maintained, and minimum stress applied to the components, even when subjected to high centrifugal forces. The assembly is modular in form and thus can be easily installed or removed from a rotor. Moreover, because of the simplicity of the arrangement, it may be relatively easily disassembled and serviced.

I claim:

1. A full wave, three phase rectifier assembly comprising first and second blocks of conducting material in side by side, but electrically isolated, relation; each of said blocks having three, radially outwardly facing diode receiving surfaces;

six diode wafers, one for each said surface and each having an anode and a cathode, the cathodes of three of said diodes being in electrical contact with respective ones of said surfaces of said first block and the anodes of the remaining three diodes being in electrical contact with respective ones of said surfaces of said second block;

six electrically conductive load shoes, one for each diode, each abutting, and in electrical contact with a respective diode oppositely of the associated surface;

three phase conductors, one for each phase, each phase conductor electrically interconnecting a load shoe associated with said first block and a load shoe associated with said second block;

two field conductors, each connected to a respective block; and a circumferential housing surrounding said load shoes and clamping them against the diode which they abut to thereby clamp such diode against its associated surface.

2. The rectifier of claim 1 wherein said housing is a cylindrical tube and said load shoes, oppositely of said diodes, have cylindrical surfaces.

3. The rectifier of claim 1 wherein an insulating layer is disposed between said tube and said load shoes.

4. The rectifier of claim 1 wherein said phase conductors are sandwiched between said insulating layer and said load shoes and clamped against the latter by said housing.

5. The rectifier of claim 1 further including a resistor within said housing and extending between and electrically connected to said blocks.

6. The rectifier of claim 1 wherein said blocks have aligned bores, one of said field conductors extending through the bore in said first block in spaced relation thereto and threaded into the bore in said second block.

7. The rectifier of claim 6 including additional aligned bores in said blocks, the other of said field conductors being threaded into the additional bore in said first block, and a resistor in the additional bore in said second block, said resistor being electrically connected to said second block in said additional bore therein and to said first block at one of said additional bore in said first block and said other field conductor.

8. The rectifier of claim 7 wherein said resistor is threaded into a bore in said other field conductor.

9. The rectifier of claim 1 wherein said housing is shrink fitted on said load shoes.

10. A full wave, three phase rectifier assembly comprising first and second blocks of conducting material in side by side, but electrically isolated, relation; each of said blocks having a cross-sectional shape of an equilateral triangle with three, radially outwardly facing diode receiving surfaces;

six diode wafers, one for each said surface and each having an anode and a cathode, the cathodes of three of said diodes being in electrical contact with respective ones of said surfaces of said first block and the anodes of the remaining three diodes being in electrical contact with respective ones of said surfaces of said second block;

six electrically conductive load shoes, one for each diode, each abutting, and in electrical contact with a respective diode oppositely of the associated surface, each load shoe having a cylindrical surface on its side remote from the associated diode;

three phase conductors, one for each phase, each phase conductor electrically interconnecting a load shoe associated with said first block and a load shoe associated with said second block, two field conductors, each connected to a respective block; and a housing having a cylindrical opening conforming to said cylindrical surfaces and surrounding said load shoes to hold them against the diode which they abut to thereby clamp such diode against its associated surface.

11. The rectifier of claim 10 wherein said phase conductors are located at said cylindrical surfaces and said housing is a tube shrink fitted against said phase conductors and said load shoes.

12. The rectifier of claim 11 further including coolant passage means in said housing.

13. A three phase rectifier assembly comprising a block of conducting material having three, radially outwardly facing diode receiving surfaces and a triangular cross section;

three diode wafers, one for each said surface and each having an anode and a cathode, one of the cathodes and the anodes of said three diodes being in electrical contact with respective ones of said surfaces of said block;

three electrically conductive load shoes, one for each diodes, each abutting, and in electrical contact with a respective diode oppositely of the associated surface;

three phase conductors, each phase conductor being electrically connected to a corresponding load shoe;

a housing surrounding and shrink fitted on said load shoes and clamping them against the diode which they abut to thereby clamp such diode against its associated surface.

14. The rectifier of claim 13 wherein said phase conductors are clamped against their respective load shoes by said housing, there being an insulating layer between said housing on the one hand and said phase conductors and load shoes on the other.

15. The rectifier of claim 13 wherein said triangular cross section is that of an equilateral triangle.

* * * * *